US009955523B2

(12) United States Patent
Qi et al.

(10) Patent No.: US 9,955,523 B2
(45) Date of Patent: Apr. 24, 2018

(54) ADAPTIVELY CHANGING AVAILABILITY OF NAN DEVICES FOR POST NAN ACTIVITIES

(71) Applicant: Intel Corporation, Santa Clara, CA (US)

(72) Inventors: Emily Qi, Camas, WA (US); Jonathan Segev, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 14/575,514

(22) Filed: Dec. 18, 2014

(65) Prior Publication Data

US 2016/0157089 A1 Jun. 2, 2016

Related U.S. Application Data

(60) Provisional application No. 62/085,972, filed on Dec. 1, 2014.

(51) Int. Cl.
| | |
|---|---|
| *H04J 3/26* | (2006.01) |
| *H04W 76/04* | (2009.01) |
| *H04W 8/00* | (2009.01) |
| *H04W 56/00* | (2009.01) |

(52) U.S. Cl.
CPC ......... *H04W 76/046* (2013.01); *H04W 8/005* (2013.01); *H04W 56/001* (2013.01)

(58) Field of Classification Search
CPC ...... H04W 8/22; H04W 8/005; H04W 76/046
USPC ................. 370/254–258, 431–546
See application file for complete search history.

(56) References Cited

U.S. PATENT DOCUMENTS

| | | | | |
|---|---|---|---|---|
| 2015/0109961 A1* | 4/2015 | Patil | ................ | H04W 4/206 370/254 |
| 2015/0109981 A1* | 4/2015 | Patil | ................ | H04L 67/1078 370/311 |
| 2015/0282149 A1* | 10/2015 | Abraham | ................ | H04W 72/0406 370/329 |
| 2016/0088611 A1* | 3/2016 | Abraham | ................ | H04W 8/005 370/329 |

OTHER PUBLICATIONS

U.S. Appl. No. 62/054,586, filed Sep. 24, 2014.*

\* cited by examiner

*Primary Examiner* — Ricky Ngo
*Assistant Examiner* — Wei-Po Kao
(74) *Attorney, Agent, or Firm* — Eversheds Sutherland (US) LLP

(57) ABSTRACT

This disclosure describes systems, methods, and computer-readable media related to adaptively changing availability of neighbor awareness networking (NAN) devices for post-NAN activities. In some embodiments, a first NAN enabled device may generate a NAN service discovery frame. The first NAN enabled device may transmit the NAN service discovery frame to a plurality of NAN enabled devices during a discovery window of the NAN. A request frame from a second NAN enabled device may be received based at least in part on transmitting the NAN service discovery frame. A response frame may be transmitted to the second NAN enabled device. A second NAN service discovery frame may be generated and include an updated availability bitmap based at least in part on data received in the request frame from the second NAN enabled device. The first NAN enabled device may transmit the second NAN service discovery frame.

23 Claims, 4 Drawing Sheets

ADAPTIVELY CHANGING AVAILABILITY OF NAN DEVICES FOR POST NAN ACTIVITIES

RELATED APPLICATIONS

This application claims priority to U.S. Provisional Patent Application No. 62/085,972, entitled "Adaptively Changing Availability of NAN Devices for Post NAN Activities," filed on Dec. 1, 2014, the contents of which are incorporated by reference herein in their entirety.

TECHNICAL FIELD

This disclosure generally relates to systems and methods for adaptively changing the availability of neighbor awareness network (NAN) devices for post-NAN activities.

BACKGROUND

User devices, such as phones and tablets, have become increasingly mobile and have an increased capability to be connected to the Internet from many different places. User devices are able to communicate with other user devices by utilizing different technologies, such as wireless networks, cellular networks, peer-to-peer networks and the like. In many of the technologies, a user device may connect to or through a central device, such as a cellular tower or remote server and may obtain information through the central device. However, such an architecture may increase network traffic.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
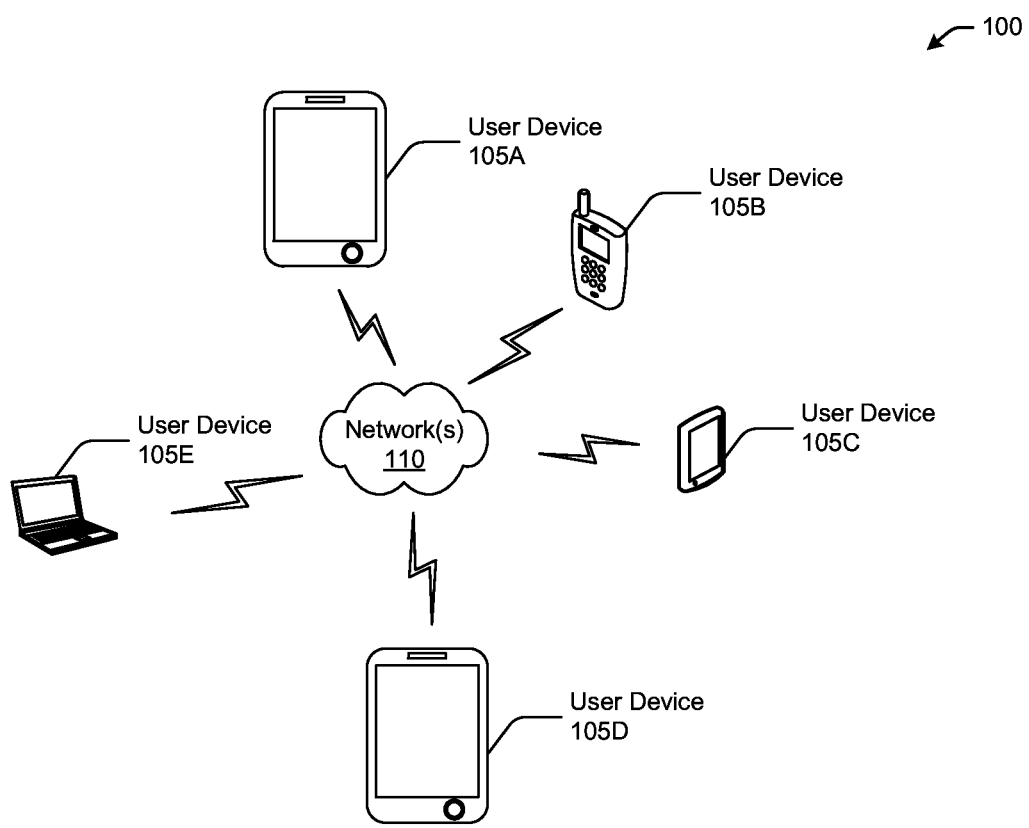
FIG. 1 depicts an illustrative data flow between various components of an illustrative system architecture for adaptively changing availability of neighbor awareness network (NAN) devices for post NAN activities in accordance with one or more embodiments of the disclosure.

This disclosure relates to, among other things, systems, methods, computer-readable media, techniques and methodology for adaptively changing availability of neighbor awareness network (NAN) devices for post NAN activities. By utilizing a neighbor awareness network (NAN), users of NAN-enabled user device may be able to meet new people, discover other nearby user device(s) and/or service(s) and interact with them and their locally relevant content. In some embodiments, a NAN enabled device (also referred to as a "NAN device") may advertise its availability of channel and timeslots that the device will be awake for post NAN activities. Examples of post NAN activities may include peer-to-peer operations, further NAN service discovery, NAN data path, WLAN infrastructure, MESH, basic service set (BSS), independent BSS (IBSS), device ranging (e.g., obtaining/calculating a distance between the device and another device), and the like.

In some embodiments, information may be transmitted before or after association and authentication between NAN-enabled user devices. In some embodiments, request and response frames may be transmitted with encryption or unprotected, based at least in part on security and privacy requirements and policies of the user devices. In some embodiments, the information of user devices may be transmitted in the channels and time slots that are indicated in the further Service Discovery Availability attributes transmitted within the NAN service discovery frame. In some embodiments, the request and response frames may be defined as public action frames. For example, they may be WFA vendor specific actions frames or a peer-to-peer action frame.

In some embodiments, a NAN-enabled device may broadcast a discovery beacon frame. The discovery beacon frame may contain data that indicates when a discovery window. A discovery window may be a time slot at which user devices may communicate with each other for discovery and exchanging of data. Nearby NAN-enabled user devices may receive the discovery beacon frame and may exchange synchronization beacon frames with the NAN-enabled user device that broadcast the discovery beacon frame to ensure time synchronization between the devices. The synchronization beacon frames may be sent during the advertised discovery window indicated in the discovery beacon frames. After the devices have synchronized their time, one of the NAN-enabled user device(s) may transmit service discovery frames broadcasting or advertising their availability. The methods and systems described herein are directed to permitting a NAN device to adaptively change the availability based on its interactions with other NAN devices. For example, a user device A may advertise its availability and the device may be awake and waiting in the advertised channel and time slot. However, if other devices are not interacting with user device A (e.g., there is no transmission or receiving activities in the advertised availability), then user device A may idle or transition to a sleep mode to conserve power rather than remaining active and waiting despite no indication that such activity will occur. In another example, user device B may advertise its availability. User device B may not be able to complete all the requested activities in the scheduled slot, in which case user device B may generate an updated service discovery frame with an updated availability to notify user devices in the NAN cluster that the availability of user device B has changed. If user device B had to wait for the next discovery window of the NAN for other NAN devices to receive an update, then user device B may receive too many requests and may not be able to properly handle them efficiently. By continuously updating the NAN cluster (or a subset of the NAN cluster) with availability updates based on traffic load and idle, the NAN devices may be able to Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture 100 for adaptively changing availability of neighbor awareness network (NAN) devices for post NAN activities in accordance with one or more embodiments of the disclosure. Multiple user device(s) 105A-105E (collectively 105) communicative over one or more network(s) 110 in a neighbor awareness network (NAN) are illustratively depicted in FIG. 1. If multiple user device(s) 105 are connected through a NAN, they may be referred to as a NAN cluster.

In some embodiments, the user device(s) 105 may utilize a NAN service discovery frame to look for services from other NAN-enabled user device(s) and make services discoverable for other NAN-enabled user device(s) 105. In some embodiments, NAN service discovery frames may include PUBLISH and SUBSCRIBE messages. In some embodiments, PUBLISH and SUBSCRIBE are NAN service capabilities and functions. In some embodiments, a PUBLISH message in a NAN service discovery frame makes its service discoverable by other NAN-enabled user device(s) 105 operating in the same NAN cluster in an unsolicited manner. This process may be referred to as unsolicited discovery. A PUBLISH message may be transmitted as solicited or unsolicited. A PUBLISH instance may be configured as "Solicited Only," where a PUBLISH message may be transmitted only in response to a received request, "Unsolicited Only," where a PUBLISH message may be transmitted to any user device 105 in the NAN cluster capable of receiving the message, or "Solicited and Unsolicited," which is a combination of both.

In some embodiments, a SUBSCRIBE instance may be configured to operate either in a passive mode or active mode. In some embodiments, a SUBSCRIBE instance may process received PUBLISH messages. In some embodiments, SUBSCRIBE message may be transmitted in active mode. In some embodiments, a SUBSCRIBE message within a NAN service discovery frame may be used to actively solicit availability of specific services from other NAN-enabled user device(s) 105. For example, NAN-enabled user device 105A may broadcast a NAN service discovery frame to the other user device(s) 105B-105E to request that user device(s) 105 to transmit a NAN service discovery frame with a PUBLISH message when response criteria are met. This may be known as solicited discovery. A mechanism for a user application to gather selected types of information about capabilities and services of other NAN Devices.

In some embodiments, a NAN device 105 may adaptively change its availability based on idle time and traffic load in the availability of a channel and timeslot. For an advertised available timeslot, if the user device has not receive any frames for a pre-determined length of time or threshold during the timeslot (e.g., 8 time units (TU)), the user device may be put in idle or sleep mode for the remainder of the time slot. In some embodiments, a NAN device may attempt to transmit frames at the beginning of the timeslot of a peer NAN device who has advertised its availability.

In some embodiments, if the user device 105 has been busy receiving and transmitting corresponding frames for the whole timeslot, the user device 105 may transmit a NAN Service Discovery frame with an updated availability bitmap to modify its availability in the current channel. The updated availability bitmap should not have an impact or overlap with its availability in other channels. More complete availability updates may be transmitted in the next scheduled discovery window of the NAN if there is any overlapping.

In one embodiment, the frames exchanged by NAN devices may utilize the P2P Public Action frame format or any WFA vendor specific action frame format. In some embodiments, a NAN service discovery frame with availability updates may be transmitted as a direct addressed frame or a group addressed frame in a current available channel and timeslot. Table 1 depicts an example format of a NAN service discovery frame. The frame may include a Service Descriptor Attribute, Further Availability Map Attribute (e.g., availability bitmap), and at least one post NAN activities attributes (e.g. WLAN Infrastructure Attribute, P2P Operation Attribute, IBSS Attribute, Ranging, and Further NAN Service Discovery Attribute, etc.).

TABLE 1

Example Frame Format in a NAN

| Attribute ID | Description | NAN SDF with availability updates |
| --- | --- | --- |
| 3 | Service Descriptor Attribute | YES, Mandatory |
| 4 | NAN Connection Capability Attribute | YES, Optional |
| 5 | WLAN Infrastructure Attribute | YES/Optional |
| 6 | P2P Operation Attribute | YES/Optional |
| 7 | IBSS Attribute | YES/Optional |
| 8 | Mesh Attribute | YES/Optional |
| 9 | Further NAN Service Discovery Attribute | YES/Optional |
| 10 | Further Availability Map Attribute | Yes/Mandatroy |
| 11 | Country Code Attribute | YES/Optional |
| 12 | Ranging Attribute | YES/Optional |
| 13-220 | Reserved | N/A |
| 221 | Vendor Specific Attribute | YES/Optional |
| 222-255 | Reserved | N/A |

The user device(s) 105 may include any suitable processor-driven computing device capable of WiFi and non-WiFi access, including, but not limited to, tablet computing devices, electronic book (e-book) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. For ease of explanation, the user device(s) 105 may be described herein in the singular; however, it should be appreciated that multiple user device(s) 105 may be provided.

Any of the user device(s) 105 may be configured to communicate with each other via one or more network(s) 110. The network(s) 110 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 110 may have any suitable communication range associated therewith and may include, for example, global networks (e.g., the Internet), metropolitan area networks (MANs), wide area networks (WANs), local area networks (LANs), wireless personal area networks (WPANs), or personal area networks (PANs). In addition, the network(s) 110 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Figure 2:
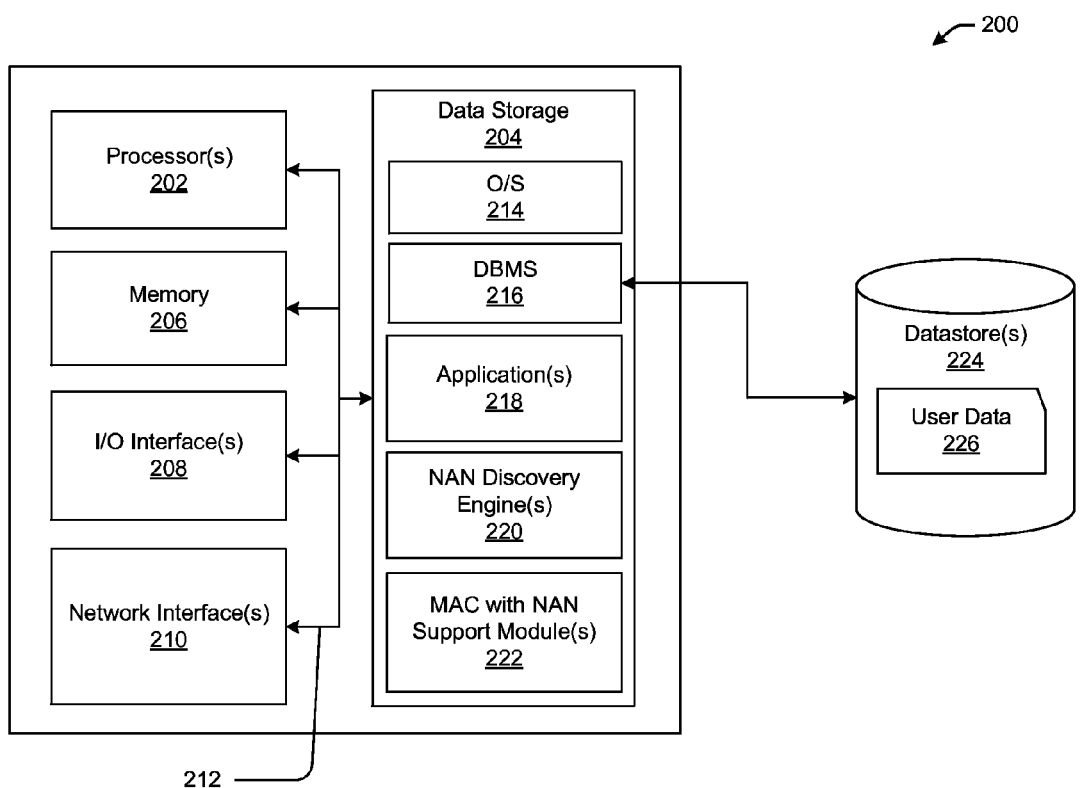
FIG. 2 is a block diagram including various hardware and software components of the illustrative system architecture depicted in FIG. 1 in accordance with one or more embodiments of the disclosure.

FIG. 2 is a schematic block diagram of an illustrative user device 200 that may be used to perform any of the data processing and user device configuration described herein in accordance with one or more example embodiments of the disclosure. In an illustrative configuration, the user device 200 may include one or more processors (processor(s)) 202, one or more memory devices 206 (generically referred to herein as memory 206), one or more input/output ("I/O") interface(s) 208, one or more network interfaces 210, and data storage 204. The user device 200 may further include one or more buses 212 that functionally couple various components of the user device 200. In certain example embodiments, the user device 200 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 212 may include at least one of a system bus, a memory bus, an address bus, or a message bus, and may permit exchange of information (e.g., data (including computer-executable code), signaling, etc.) between various components of the user device 200. The bus(es) 212 may include, without limitation, a memory bus or a memory controller, a peripheral bus, an accelerated graphics port, and so forth. The bus(es) 212 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 206 of the user device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 206 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 206 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 204 may include removable storage and/or non-removable storage including, but not limited to, magnetic storage, optical disk storage, solid-state storage, and/or tape storage. The data storage 204 may provide non-volatile storage of computer-executable instructions and other data. The memory 206 and the data storage 204, removable and/or non-removable, are examples of computer-readable storage media (CRSM) as that term is used herein.

The data storage 204 may store computer-executable code, instructions, or the like that may be loadable into the memory 206 and executable by the processor(s) 202 to cause the processor(s) 202 to perform or initiate various operations. The data storage 204 may additionally store data that may be copied to memory 206 for use by the processor(s) 202 during the execution of the computer-executable instructions. Moreover, output data generated as a result of execution of the computer-executable instructions by the processor(s) 202 may be stored initially in memory 206, and may ultimately be copied to data storage 204 for non-volatile storage.

More specifically, the data storage 204 may store one or more operating systems (O/S) 214; one or more database management systems (DBMS) 216; and one or more program modules, applications, or the like such as, for example, one or more application(s) 218, one or more NAN discovery engine(s) 220, and/or more media access control (MAC) with NAN support module(s) 222. The data storage 204 may further store any of variety of other types of modules. Further, any program modules stored in the data storage 204 may include one or more sub-modules. Further, any data stored in the data storage 204 may be loaded into the memory 206 for use by the processor(s) 202 in executing computer-executable code. In addition, any data potentially stored in one or more datastores 224 (e.g., user data 226) may be accessed via the DBMS 216 and loaded in the memory 206 for use by the processor(s) 202 in executing computer-executable code.

The processor(s) 202 may be configured to access the memory 206 and execute computer-executable instructions loaded therein. For example, the processor(s) 202 may be configured to execute computer-executable instructions of the various program modules of the user device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality supported by the various program modules depicted in FIG. 2, the application(s) 218 may include computer-executable instructions, code, or the like that, responsive to execution by one or more of the processor(s) 202, may obtain data, process and/or generate data, and present data to a user of the user device 200. In some embodiments, the application(s) 218 may utilize ranging data and/or location data of other user devices 105 to process, generate, and/or present data to a user of the user device 200. In some embodiments, the ranging data and/or location data of other use device(s) 200 may be obtained via the neighbor awareness networking methods described herein.

The NAN engine(s) 220 may include computer-executable instructions, code, or the like that, responsive to execution by one or more of the processor(s) 202, may provide publish and subscribe services to application(s) 218 for service discovery purposes. Additionally, the NAN discovery engine(s) 220 may generate and/or facilitate transmission of different type of frames in a NAN environment, such as NAN service discovery frames, discovery beacon frames, synchronization beacon frames, and the like. In some embodiments, the NAN discovery engine 220 may determine whether an updated availability bitmap needs to be transmitted to the NAN cluster (or a subset of the NAN cluster) based on idle or traffic load of the user device 105 in response to its interaction with peer NAN devices 105. In some embodiments, the NAN engine 220 may generate an updated availability bitmap to include in a service discovery frame to be sent to the NAN cluster. In some embodiments, the NAN engine 220 may identify a subset of the NAN cluster to transmit the new service discovery frame with the updated bitmap (e.g., based on a specific channel that is affected by the updated availability).

The MAC with NAN support module(s) 222 may include computer-executable instructions, code, or the like that, responsive to execution by one or more of the processor(s) 202, may provide the means for NAN-enabled user device(s) 105 to synchronize in time and frequency to provide common availability periods for service discovery frames from/to the NAN discovery engine(s) 220. The MAC with NAN support module 222 may provide addressing and channel access control mechanisms that make it possible for NAN-enabled user device(s) 105 to communicate within a multiple access network that incorporates a shared medium, such as Ethernet. In some embodiments, the MAC with NAN support module(s) 222 may coordinate communication of NAN frames (e.g., discovery beacon frames, synchronization beacon frames, service discovery frames, etc.) to other NAN-enabled user device(s) 105 and manage time and frequency data associated with the NAN environment in a cluster of NAN-enabled user device(s) 105.

Referring now to other illustrative components depicted as being stored in the data storage 204, the O/S 214 may be loaded from the data storage 204 into the memory 206 and may provide an interface between other application software executing on the device 200 and hardware resources of the device 200. More specifically, the O/S 214 may include a set of computer-executable instructions for managing hardware resources of the device 200 and for providing common services to other application programs (e.g., managing memory allocation among various application programs). The O/S 214 may include any operating system now known or which may be developed in the future including, but not limited to, any server operating system, any mainframe operating system, or any other proprietary or non-proprietary operating system.

The DBMS 216 may be loaded into the memory 206 and may support functionality for accessing, retrieving, storing, and/or manipulating data stored in the memory 206, data stored in the data storage 204, and/or data stored in the one or more datastores 224. The DBMS 216 may use any of a variety of database models (e.g., relational model, object model, etc.) and may support any of a variety of query languages. The DBMS 216 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the user device 200 is a mobile device, the DBMS 216 may be any suitable light-weight DBMS optimized for performance on a mobile device. Referring to the example types of data depicted as being stored in the datastore(s) 224, the user data 226 may include kind of data associated with a specific user device 200, such as user preferences, application data generated by one or more application(s) 218 and associated with a user of the user device 200, etc. It should be appreciated that "data," as that term is used herein, includes computer-executable instructions, code, or the like.

Referring now to other illustrative components of the device 200, the one or more input/output (I/O) interfaces 208 may facilitate the receipt of input information by the device 200 from one or more I/O devices as well as the output of information from the device 200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 200 or may be separate. The I/O devices may further include, for example, any number of peripheral devices such as data storage devices, printing devices, and so forth.

The I/O interface(s) 208 may also include an interface for an external peripheral device connection such as universal serial bus (USB), FireWire, Thunderbolt, Ethernet port or other connection protocol that may connect to one or more networks. The I/O interface(s) 208 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 200 may further include one or more network interfaces 210 via which the user device 200 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Any of the user device(s) 105 may include one or more communications antennae (not pictured). Communications antenna may be any suitable type of antenna corresponding to the communications protocols used by the user device(s) 105. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 105.

Any of the user device(s) 105 may include transmit/receive (transceiver) or radio components may include any suitable radio and/or transceiver for transmitting and/or receiving radio frequency (RF) signals in the bandwidth and/or channels corresponding to the communications protocols utilized by any of the user device(s) 105 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 200, and the associated functionality that such components support, are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Figure 3:
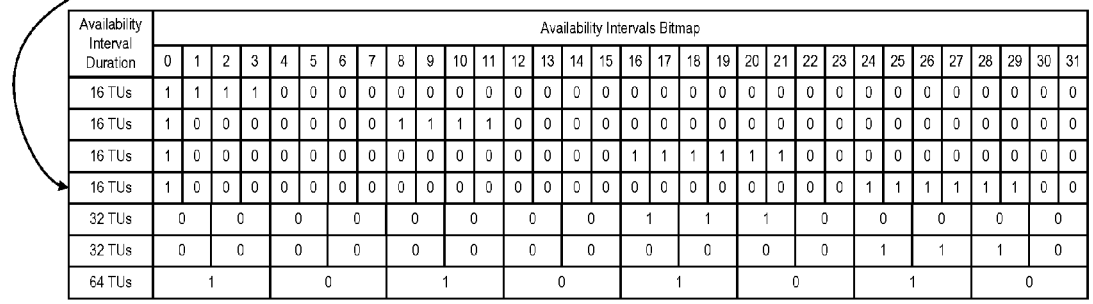
FIG. 3 is an exemplary depiction of an availability bitmap for adaptively changing availability of NAN devices for post NAN activities in accordance with one or more embodiments of the disclosure.

FIG. 3 is an exemplary depiction 300 of an availability bitmap for adaptively changing availability of NAN devices for post NAN activities in accordance with one or more embodiments of the disclosure. The availability bitmap depicted may be the information provided in the Further Availability Map Attribute of Table 1. As shown, the availability bitmap may show the operating class or channel number, availability interval duration (e.g., in Time Units (TU)) and an indication of availability where 0 indicates available and 1 indicates busy.

Illustrative Process Flow

Figure 4:
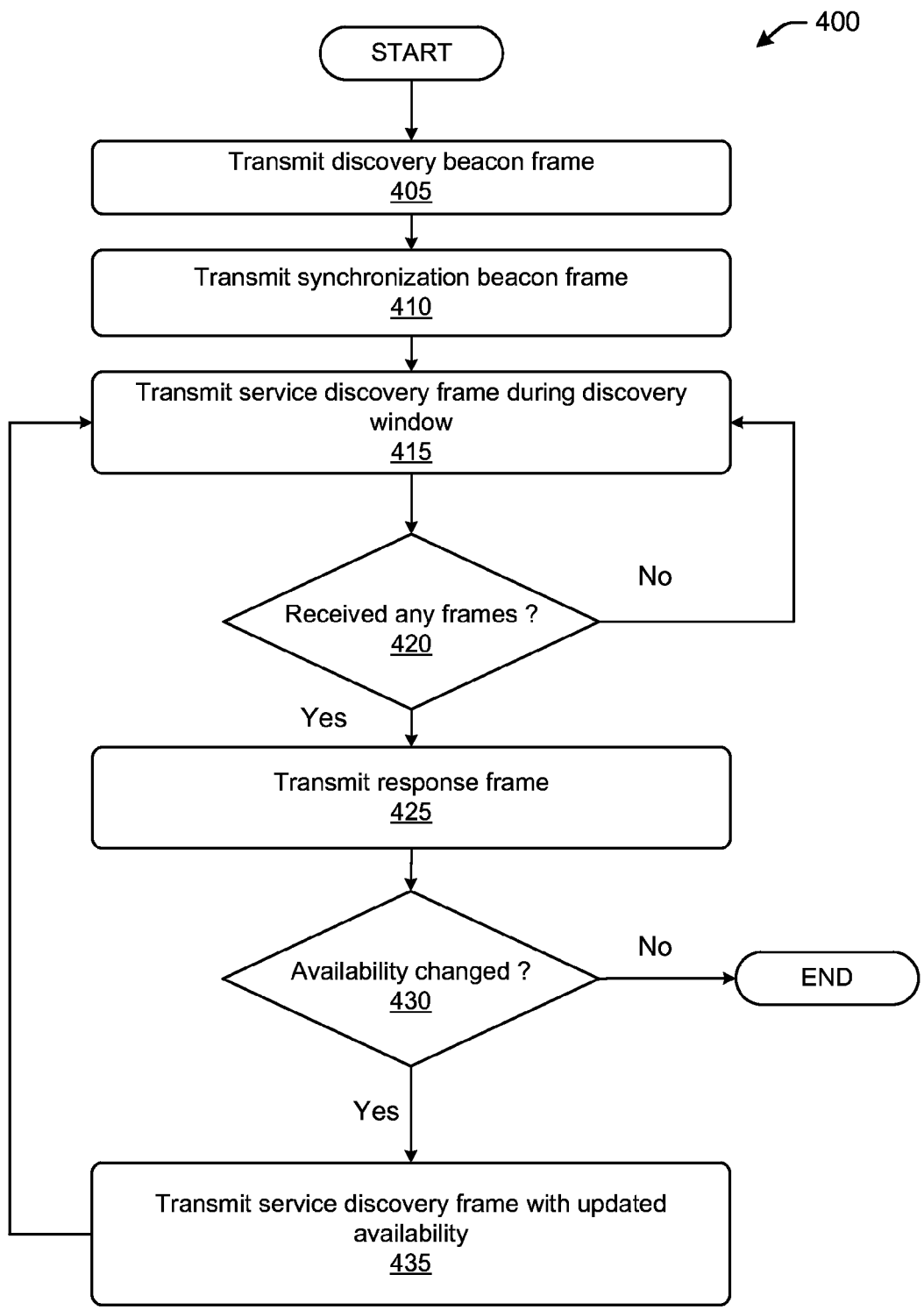
FIG. 4 is a process flow diagram of an illustrative method for adaptively changing availability of NAN devices for post NAN activities in accordance with one or more embodiments of the disclosure.

FIG. 4 is a process flow diagram of an illustrative method 400 for adaptively changing availability of NAN devices for post NAN activities in accordance with one or more embodiments of the disclosure. At block 405, the MAC a first NAN-enabled user device 105A may transmit a discovery beacon frame to one or more other NAN-enabled user device(s) 105. In some embodiments, the discovery beacon frames may advertise the presence of an available NAN cluster (e.g., multiple user device(s) 105 connected via a NAN). In some embodiments, the discovery beacon frames are sent at a minimum periodic interval. In some embodiments, the discovery may be through passive scanning of NAN enabled user device(s) 105. In some embodiments, the discovery beacon frames may include discovery window timing information for a NAN. In some embodiments, the NAN discovery frame may be broadcast to the NAN cluster of user device(s) 105 by the MAC with NAN support module 222 of the first user device 105A. In some embodiments, the NAN cluster of user device(s) 105 may include a second user device 105B, which may receive the NAN service discovery frame broadcast by the first user device 105A. The NAN service discovery frame may be transmitted in the discovery windows of the NAN cluster of user devices 105.

At block 410, the first NAN-enabled user device 105A may generate and broadcast a synchronization beacon frame to NAN-enabled user devices in close proximity to the user device 105A. The synchronization beacon frame may be sent during the discovery windows of the NAN-enabled user devices 105 (e.g., obtained from the discovery beacon frame) and may ensure time synchronization within a NAN cluster of user device(s) 105.

At block 415, the first NAN-enabled user device 105A may generate and transmit a service discovery frame during the discovery window, advertising its availability. In some embodiments, the service discovery frame may be broadcast to call the user device(s) 105 of the NAN cluster. The NAN service discovery frame may be generated by the NAN discovery engine 220 of the first user device 105A.

At block 420, the NAN discovery engine 220 may determine whether any request frames are received during an advertised available timeslot from any of the user device(s) 105 of the NAN cluster. If at block 420, no frames are received, the NAN discovery engine 220 may facilitate idling or putting the user device 105A in a sleep state for the remainder of the available time slot. For example, if the NAN discovery engine 220 determines that no frames (e.g., directly addressed to the user device 105A or a group addressed frame for the NAN cluster) have been received after a pre-determine time period has elapsed (e.g., after 8 TU), then the NAN discovery engine 220 may facilitate idling or putting the user device 105 in a sleep state until the next available time slot, next activity, next discovery window, etc. The user device 105A may then become active again during the next discovery window (e.g., block 415) at which time it may send a new service discovery frame with an updated availability bitmap to all the user device(s) 105 in the NAN cluster.

If at block 420, the NAN discovery engine 220 determines that frames have been received at the user device 105A, the NAN discovery engine 220 may generate a response frame (e.g., acknowledgement frame) and the MAC with NAN support module 222 may transmit the response frame to the sender of the request frame at block 425.

At block 430, the NAN discovery engine 220 may determine whether the received request frame affected the availability of the user device 105A. If the NAN discovery engine 220 determines that the availability of the user device 105A has not been affected, then the method 400 may end. If the NAN discovery engine 220 determines that the availability of the user device 105A has been affected, then the NAN discovery engine 220 may generate a new service discovery frame with an updated availability bitmap at block 435. In some embodiments, the NAN discovery engine 220 may identify a subset of the user device(s) 105 in the NAN cluster that are communicating or otherwise associated with a channel that has been affected by the availability update on the user device 105A. The NAN discovery engine 220 may facilitate transmission of the new service discovery frame with the updated availability bitmap to the identified subset of user device(s) 105.

In some embodiments, the NAN discovery engine 220 may then transmit another service discovery frame with an updated availability bitmap to all the user device(s) 105 of the NAN cluster during the next discovery window of the NAN (e.g., block 415).

In one embodiment, a computer-readable medium may store computer-executable instructions which, when executed by a processor, cause the processor to perform operations comprising: generating, by a first neighbor awareness network (NAN) enabled device of a NAN, a NAN service discovery frame comprising channel information, time slot information, and an availability bitmap; transmitting, by the first NAN enabled device, the NAN service discovery frame to a plurality of NAN enabled devices during a discovery window of the NAN; receiving, by the first NAN enabled device, a request frame from a second NAN enabled device based at least in part on transmitting the NAN service discovery frame; transmitting, by the first NAN enabled device, a response frame to the second NAN enabled device; generating, by the first NAN enabled device, a second NAN service discovery frame comprising an updated availability bitmap based at least in part on data received in the request frame from the second NAN enabled device; and transmitting, by the first NAN enabled device, the second NAN service discovery frame.

In one aspect of an embodiment, the operations may further comprise transmitting, by the first NAN enabled device, a discovery beacon frame at periodic intervals, wherein the discovery beacon frame comprises information associated with the discovery window of the NAN. In one aspect of an embodiment, the request frame and the response frame may be public action frames. In one aspect of an embodiment, the operations may further comprise determining, by the first NAN enabled device, that a time threshold associated with a timeslot of the NAN service discovery frame has been exceeded without receiving the request frame or a third NAN service discovery frame from the second user device during the timeslot of the NAN service discovery frame; and facilitating, by the first NAN enabled device, a sleep state of the first NAN enabled device for a remaining portion of the timeslot of the NAN service discovery frame. In one aspect of an embodiment, transmitting, by the first NAN enabled device, the second NAN service discovery frame may further comprises transmitting, by the first NAN enabled device, the second NAN service discovery frame to a subset of the plurality of NAN enabled devices comprising NAN enabled devices on a channel utilized by the first NAN enabled device. In one aspect of an embodiment, the operations may further comprise generating, by the first NAN enabled device, a third NAN service discovery frame to the plurality of NAN enabled devices during the discovery window of the NAN. In one aspect of an embodiment, the operations may further comprise transmitting, by the first NAN enabled device, a synchronization beacon frame to the plurality of NAN enabled devices associated with the NAN.

In another embodiment, a method may comprise generating, by a first neighbor awareness network (NAN) enabled device of a NAN, a NAN service discovery frame comprising channel information, time slot information, and an availability bitmap; transmitting, by the first NAN enabled device, the NAN service discovery frame to a plurality of NAN enabled devices during a discovery window of the NAN; receiving, by the first NAN enabled device, a request frame from a second NAN enabled device based at least in part on transmitting the NAN service discovery frame; transmitting, by the first NAN enabled device, a response frame to the second NAN enabled device; generating, by the first NAN enabled device, a second NAN service discovery frame comprising an updated availability bitmap based at least in part on data received in the request frame from the second NAN enabled device; and transmitting, by the first NAN enabled device, the second NAN service discovery frame.

In one aspect of an embodiment, the method may further comprise transmitting, by the first NAN enabled device, a discovery beacon frame at periodic intervals, wherein the discovery beacon frame comprises information associated with the discovery window of the NAN. In one aspect of an embodiment, the request frame and the response frame may be public action frames. In one aspect of an embodiment, the method may further comprise determining, by the first NAN enabled device, that a time threshold associated with a timeslot of the NAN service discovery frame has been exceeded without receiving the request frame or a third NAN service discovery frame from the second user device during the timeslot of the NAN service discovery frame; and facilitating, by the first NAN enabled device, a sleep state of the first NAN enabled device for a remaining portion of the timeslot of the NAN service discovery frame. In one aspect of an embodiment, transmitting, by the first NAN enabled device, the second NAN service discovery frame may further comprises transmitting, by the first NAN enabled device, the second NAN service discovery frame to a subset of the plurality of NAN enabled devices comprising NAN enabled devices on a channel utilized by the first NAN enabled device. In one aspect of an embodiment, the method may further comprise generating, by the first NAN enabled device, a third NAN service discovery frame to the plurality of NAN enabled devices during the discovery window of the NAN. In one aspect of an embodiment, the method may further comprise transmitting, by the first NAN enabled device, a synchronization beacon frame to the plurality of NAN enabled devices associated with the NAN.

In another embodiment, a device may comprise at least one antenna; at least one transceiver; at least one memory storing computer-executable instructions; and at least one processor, wherein the at least one processor is configured to access the at least one memory and to execute the computer-executable instructions to: generate a neighbor aware network (NAN) service discovery frame comprising channel information, time slot information, and an availability bitmap; transmit the NAN service discovery frame to a plurality of NAN enabled devices of a NAN during a discovery window of the NAN; receive a request frame from a second NAN enabled device based at least in part on transmitting the NAN service discovery frame; transmit a response frame to the second NAN enabled device; generate a second NAN service discovery frame comprising an updated availability bitmap based at least in part on data received in the request frame from the second NAN enabled device; and transmit the second NAN service discovery frame.

In one aspect of an embodiment, the at least one processor may be further configured to transmit a discovery beacon frame at periodic intervals, wherein the discovery beacon frame comprises information associated with the discovery window of the NAN. In one aspect of an embodiment, the at least one processor may be further configured to determine that a time threshold associated with a timeslot of the NAN service discovery frame has been exceeded without receiving the request frame or a third NAN service discovery frame from the second user device during the timeslot of the NAN service discovery frame; and facilitate a sleep state of the first NAN enabled device for a remaining portion of the timeslot of the NAN service discovery frame. In one aspect of an embodiment, to transmit the second NAN service discovery frame, the at least one processor may be further configured to transmit the second NAN service discovery frame to a subset of the plurality of NAN enabled devices comprising NAN enabled devices on a channel utilized by the first NAN enabled device. In one aspect of an embodiment, the at least one processor may be further configured to generate a third NAN service discovery frame to the plurality of NAN enabled devices during the discovery window of the NAN. In one aspect of an embodiment, the at least one processor may be further configured to transmit a synchronization beacon frame to the plurality of NAN enabled devices associated with the NAN. In one aspect of an embodiment, the request frame and the response frame may be public action frames.

In another embodiment, a system may comprise at least one antenna; at least one transceiver; at least one memory storing computer-executable instructions; and at least one processor, wherein the at least one processor is configured to access the at least one memory and to execute the computer-executable instructions to generate a neighbor aware network (NAN) service discovery frame comprising channel information, time slot information, and an availability bitmap; transmit the NAN service discovery frame to a plurality of NAN enabled devices of a NAN during a discovery window of the NAN; receive a request frame from a second NAN enabled device based at least in part on transmitting the NAN service discovery frame; transmit a response frame to the second NAN enabled device; generate a second NAN service discovery frame comprising an updated availability bitmap based at least in part on data received in the request frame from the second NAN enabled device; and transmit the second NAN service discovery frame.

In one aspect of an embodiment, the at least one processor may be further configured to transmit a discovery beacon frame at periodic intervals, wherein the discovery beacon frame comprises information associated with the discovery window of the NAN. In one aspect of an embodiment, the at least one processor may be further configured to determine that a time threshold associated with a timeslot of the NAN service discovery frame has been exceeded without receiving the request frame or a third NAN service discovery frame from the second user device during the timeslot of the NAN service discovery frame; and facilitate a sleep state of the first NAN enabled device for a remaining portion of the timeslot of the NAN service discovery frame. In one aspect of an embodiment, to transmit the second NAN service discovery frame, the at least one processor may be further configured to transmit the second NAN service discovery frame to a subset of the plurality of NAN enabled devices comprising NAN enabled devices on a channel utilized by the first NAN enabled device. In one aspect of an embodiment, the at least one processor may be further configured to generate a third NAN service discovery frame to the plurality of NAN enabled devices during the discovery window of the NAN. In one aspect of an embodiment, the at least one processor may be further configured to transmit a synchronization beacon frame to the plurality of NAN enabled devices associated with the NAN. In one aspect of an embodiment, the request frame and the response frame may be public action frames.

In another embodiment, a system may comprise a means for generating, by a first neighbor awareness network (NAN) enabled device of a NAN, a NAN service discovery frame comprising channel information, time slot information, and an availability bitmap; a means for transmitting the NAN service discovery frame to a plurality of NAN enabled devices during a discovery window of the NAN; a means for receiving a request frame from a second NAN enabled device based at least in part on transmitting the NAN service discovery frame; a means for transmitting a response frame to the second NAN enabled device; a means for generating a second NAN service discovery frame comprising an updated availability bitmap based at least in part on data received in the request frame from the second NAN enabled device; and a means for transmitting the second NAN service discovery frame.

In one aspect of an embodiment, the system may further comprise a means for transmitting a discovery beacon frame at periodic intervals, wherein the discovery beacon frame comprises information associated with the discovery window of the NAN. In one aspect of an embodiment, the request frame and the response frame may be public action frames. In one aspect of an embodiment, the system may further comprise a means for determining that a time threshold associated with a timeslot of the NAN service discovery frame has been exceeded without receiving the request frame or a third NAN service discovery frame from the second user device during the timeslot of the NAN service discovery frame; and a means for facilitating a sleep state of the first NAN enabled device for a remaining portion of the timeslot of the NAN service discovery frame. In one aspect of an embodiment, the means for transmitting the second NAN service discovery frame may further comprise a means for transmitting the second NAN service discovery frame to a subset of the plurality of NAN enabled devices comprising NAN enabled devices on a channel utilized by the first NAN enabled device. In one aspect of an embodiment, the system may comprise a means for generating a third NAN service discovery frame to the plurality of NAN enabled devices during the discovery window of the NAN. In one aspect of an embodiment, the system may further comprise a means for transmitting a synchronization beacon frame to the plurality of NAN enabled devices associated with the NAN.

In an embodiment, an apparatus may include at least one antenna; at least one transceiver; at least one memory storing computer-executable instructions; and at least one processor, wherein the at least one processor is configured to access the at least one memory and to execute the computer-executable instructions to: receive a neighbor aware network (NAN) service discovery frame, from a NAN enabled device of a NAN, during a discovery window of a NAN, wherein the NAN service discovery frame comprises channel information, time slot information, and an availability bitmap; transmit a request frame to the NAN enabled device based at least in part on the NAN service discovery frame; receive a response frame to the second NAN enabled device; and receive, from the NAN enabled device, a second NAN service discovery frame comprising an updated availability bitmap based at least in part on data received in the request frame.

In one aspect of an embodiment, the at least one processor may be further configured to transmit a discovery beacon frame at periodic intervals, wherein the discovery beacon frame comprises information associated with the discovery window of the NAN. In one aspect of an embodiment, the at least one processor may be further configured to transmit a synchronization beacon frame to a plurality of NAN enabled devices associated with the NAN.

In an embodiment, a device may include at least one antenna; at least one transceiver; at least one memory storing computer-executable instructions; and at least one processor, wherein the at least one processor is configured to access the at least one memory and to execute the computer-executable instructions to: receive a neighbor aware network (NAN) service discovery frame, from a NAN enabled device of a NAN, during a discovery window of a NAN, wherein the NAN service discovery frame comprises channel information, time slot information, and an availability bitmap; transmit a request frame to the NAN enabled device based at least in part on the NAN service discovery frame; receive a response frame to the second NAN enabled device; and receive, from the NAN enabled device, a second NAN service discovery frame comprising an updated availability bitmap based at least in part on data received in the request frame.

In one aspect of an embodiment, the at least one processor may be further configured to transmit a discovery beacon frame at periodic intervals, wherein the discovery beacon frame comprises information associated with the discovery window of the NAN. In one aspect of an embodiment, the at least one processor may be further configured to transmit a synchronization beacon frame to a plurality of NAN enabled devices associated with the NAN.

In an embodiment, a method may include receiving, by a first neighbor aware network (NAN) enabled device associated with a NAN, a NAN service discovery frame from a second NAN enabled device of the NAN, during a discovery window of the NAN, wherein the NAN service discovery frame comprises channel information, time slot information, and an availability bitmap; transmitting, by the first NAN enabled device, a request frame to the second NAN enabled device based at least in part on the NAN service discovery frame; receiving, by the first NAN enabled device, a response frame to the second NAN enabled device; and receiving, by the first NAN enabled device from the second NAN enabled device, a second NAN service discovery frame comprising an updated availability bitmap based at least in part on data received in the request frame.

In one aspect of an embodiment, the method may further comprise transmitting, by the first NAN enabled device, a discovery beacon frame at periodic intervals, wherein the discovery beacon frame comprises information associated with the discovery window of the NAN. In one aspect of an embodiment, the method may further comprise transmitting a synchronization beacon frame to a plurality of NAN enabled devices associated with the NAN.

In an embodiment, a computer-readable medium may store computer-executable instructions which, when executed by a processor, cause the processor to perform operations comprising receiving, by a first neighbor aware network (NAN) enabled device associated with a NAN, a NAN service discovery frame from a second NAN enabled device of the NAN, during a discovery window of the NAN, wherein the NAN service discovery frame comprises channel information, time slot information, and an availability bitmap; transmitting, by the first NAN enabled device, a request frame to the second NAN enabled device based at least in part on the NAN service discovery frame; receiving, by the first NAN enabled device, a response frame to the second NAN enabled device; and receiving, by the first NAN enabled device from the second NAN enabled device, a second NAN service discovery frame comprising an updated availability bitmap based at least in part on data received in the request frame.

In one aspect of an embodiment, the operations may further comprise transmitting, by the first NAN enabled device, a discovery beacon frame at periodic intervals, wherein the discovery beacon frame comprises information associated with the discovery window of the NAN. In one aspect of an embodiment, the operations may further comprise transmitting a synchronization beacon frame to a plurality of NAN enabled devices associated with the NAN.

CONCLUSION

It should be appreciated that the program modules, applications, computer-executable instructions, code, or the like depicted in this disclosure as being stored in data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device (e.g., user device 105), and/or hosted on other computing device(s) accessible via one or more networks, may be provided to support functionality provided by the program modules, applications, or computer-executable code depicted herein and/or additional or alternate functionality. Further, functionality may be modularized differently such that processing described as being supported collectively by the collection of program modules described herein may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that a device (e.g., user device 105) may include alternate and/or additional hardware, software, or firmware components beyond those described or depicted without departing from the scope of the disclosure. More particularly, it should be appreciated that software, firmware, or hardware components depicted as forming part of the device (e.g., user device 105) are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the method 400 may have been described above as being performed by one or more components of a device, or more specifically, by one or more one or more program modules executing on such a device. It should be appreciated, however, that any of the operations of the method 400 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the method 400 may be described in the context of the illustrative user device 200, it should be appreciated that such operations may be implemented in connection with numerous other system configurations.

The operations described and depicted in the illustrative method of FIG. 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A non-transitory computer-readable medium storing computer-executable instructions which, when executed by a processor, cause the processor to perform operations comprising:
   generating, by a first neighbor awareness network (NAN) enabled device of a NAN, a first NAN service discovery frame comprising at least one of channel information, time slot information, or an availability bitmap, wherein the availability bitmap includes at least one of a first indication of a first availability of the first NAN enabled device or a first availability duration of the first NAN enabled device;
   transmitting, by the first NAN enabled device, the first NAN service discovery frame to a plurality of NAN enabled devices during a discovery window of the NAN;
   receiving, by the first NAN enabled device, a request frame from a second NAN enabled device of the plurality of NAN enabled devices based on the transmitting the first NAN service discovery frame, the request frame including data;
   transmitting, by the first NAN enabled device, a response frame to the second NAN enabled device;

determining, by the first NAN enabled device, based on the data, a second availability of the first NAN enabled device;

generating, by the first NAN enabled device, a second NAN service discovery frame comprising a second availability bitmap based on the second availability of the first NAN enabled device, wherein the second availability bitmap includes at least one of a second indication of the second availability of the first NAN enabled device or a second availability duration of the first NAN enabled device; and transmitting, by the first NAN enabled device, the second NAN service discovery frame to at least one NAN enabled device of the plurality of NAN enabled devices.

2. The non-transitory computer-readable medium of claim 1,
wherein the operations further comprise:
transmitting, by the first NAN enabled device, a discovery beacon frame at periodic intervals, wherein the discovery beacon frame comprises information associated with the discovery window of the NAN.

3. The non-transitory computer-readable medium of claim 1, wherein at least one of the request frame or the response frame comprises a public action frame.

4. The non-transitory computer-readable medium of claim 1, wherein the operations further comprise:
determining, by the first NAN enabled device, that a time threshold associated with a timeslot of the first NAN service discovery frame has been exceeded without receiving the request frame or a third NAN service discovery frame from a third NAN enabled device during the timeslot of the first NAN service discovery frame; and
placing, by the first NAN enabled device, the first NAN enabled device in a sleep state for a remaining portion of the timeslot of the first NAN service discovery frame.

5. The non-transitory computer-readable medium of claim 1, wherein transmitting, by the first NAN enabled device, the second NAN service discovery frame further comprises:
transmitting, by the first NAN enabled device, on a channel utilized by the first NAN enabled device, the second NAN service discovery frame to a subset of devices of the plurality of NAN enabled devices, the subset comprising one or more NAN enabled devices.

6. The computer-readable medium of claim 5, wherein the operations further comprise:
generating, by the first NAN enabled device, a third NAN service discovery frame; and
transmitting, by the first NAN enabled device, the third NAN service discovery frame to the plurality of NAN enabled devices during the discovery window of the NAN.

7. The non-transitory computer-readable medium of claim 1, wherein the operations further comprise:
transmitting, by the first NAN enabled device, a synchronization beacon frame to the plurality of NAN enabled devices.

8. A method comprising:
generating, by a first neighbor awareness network (NAN) enabled device of a NAN, a first NAN service discovery frame comprising at least one of channel information, time slot information, or an availability bitmap, wherein the availability bitmap includes at least one of a first indication of a first availability of the first NAN enabled device or a first availability duration of the first NAN enabled device;

transmitting, by the first NAN enabled device, the first NAN service discovery frame to a plurality of NAN enabled devices during a discovery window of the NAN;

receiving, by the first NAN enabled device, a request frame from a second NAN enabled device of the plurality of NAN enabled devices based on the transmitting the first NAN service discovery frame, the request frame including data;

transmitting, by the first NAN enabled device, a response frame to the second NAN enabled device;

determining, by the first NAN enabled device, based on the data, a second availability of the first NAN enabled device;

generating, by the first NAN enabled device, a second NAN service discovery frame comprising a second availability bitmap based on the second availability of the first NAN enabled device, wherein the second availability bitmap includes at least one of a second indication of the second availability of the first NAN enabled device or a second availability duration of the first NAN enabled device; and transmitting, by the first NAN enabled device, the second NAN service discovery frame to at least one NAN enabled device of the plurality of NAN enabled devices.

9. The method of claim 8, further comprising:
transmitting, by the first NAN enabled device, a discovery beacon frame at periodic intervals, wherein the discovery beacon frame comprises information associated with the discovery window of the NAN.

10. The method of claim 8, wherein at least one of the request frame or the response frame comprises a public action frame.

11. The method of claim 8, further comprising:
determining, by the first NAN enabled device, that a time threshold associated with a timeslot of the first NAN service discovery frame has been exceeded without receiving the request frame or a third NAN service discovery frame from a third NAN enabled device during the timeslot of the first NAN service discovery frame; and
placing, by the first NAN enabled device, the first NAN enabled device in a sleep state for a remaining portion of the timeslot of the first NAN service discovery frame.

12. The method of claim 11, further comprising:
generating, by the first NAN enabled device, a third NAN service discovery frame; and
transmitting, by the first NAN enabled device, the third NAN service discovery frame to the plurality of NAN enabled devices during the discovery window of the NAN.

13. The method of claim 8, wherein transmitting, by the first NAN enabled device, the second NAN service discovery frame further comprises:
transmitting, by the first NAN enabled device, on a channel utilized by the first NAN enabled device, the second NAN service discovery frame to a subset of devices of the plurality of NAN enabled devices, the subset comprising one or more NAN enabled devices.

14. The method of claim 8, further comprising:
transmitting, by the first NAN enabled device, a synchronization beacon frame to the plurality of NAN enabled devices.

15. A first neighbor aware network (NAN) enabled device comprising:
at least one antenna;
at least one transceiver;
at least one memory storing computer-executable instructions; and
at least one processor, wherein the at least one processor is configured to access the at least one memory and to execute the computer-executable instructions to:
generate a first NAN service discovery frame comprising at least one of channel information, time slot information, or an availability bitmap, wherein the availability bitmap includes at least one of a first indication of a first availability of the first NAN enabled device or a first availability duration of the first NAN enabled device;
transmit the first NAN service discovery frame to a plurality of NAN enabled devices of a NAN during a discovery window of the NAN;
receive a request frame from a second NAN enabled device based at least in part on the transmitting the first NAN service discovery frame, the request frame including data;
transmit a response frame to the second NAN enabled device;
determine, based on the data, a second availability of the first NAN enabled device;
generate a second NAN service discovery frame comprising a second availability bitmap based on the second availability of the first NAN enabled device, wherein the second availability bitmap includes at least one of a second indication of the second availability of the first NAN enabled device or a second availability duration of the first NAN enabled device; and
transmit the second NAN service discovery frame to at least one NAN enabled device of the plurality of NAN enabled devices.

16. The first NAN enabled device of claim 15, wherein the at least one processor is further configured to:
transmit a discovery beacon frame at periodic intervals, wherein the discovery beacon frame comprises information associated with the discovery window of the NAN.

17. The first NAN enabled device of claim 15, wherein and the at least one processor is further configured to:
determine that a time threshold associated with a timeslot of the first NAN service discovery frame has been exceeded without receiving the request frame or a third NAN service discovery frame from a third NAN enabled device during the timeslot of the first NAN service discovery frame; and
place the first NAN enabled device in a sleep state for a remaining portion of the timeslot of the first NAN service discovery frame.

18. The first NAN enabled device of claim 15, wherein to transmit the second NAN service discovery frame, the at least one processor is further configured to:
transmit, on a channel utilized by the first NAN enabled device, the second NAN service discovery frame to a subset of devices of the plurality of NAN enabled devices, the subset comprising NAN enabled devices.

19. The first NAN enabled device of claim 18, wherein the at least one processor is further configured to:
generate a third NAN service discovery frame; and
transmit the third NAN service discovery frame to the plurality of NAN enabled devices during the discovery window of the NAN.

20. The first NAN enabled device of claim 15, wherein the at least one processor is further configured to:
transmit a synchronization beacon frame to the plurality of NAN enabled devices.

21. An apparatus comprising:
at least one antenna;
at least one transceiver;
at least one memory storing computer-executable instructions; and
at least one processor, wherein the at least one processor is configured to access the at least one memory and to execute the computer-executable instructions to:
receive, from a first neighbor aware network (NAN) enabled device of a NAN, a first NAN service discovery frame during a discovery window of the NAN, wherein the first NAN service discovery frame comprises at least one of channel information, time slot information, or an availability bitmap, wherein the availability bitmap includes at least one of a first indication of a first availability of the first NAN enabled device or a first availability duration of the first NAN enabled device;
transmit a request frame to the first NAN enabled device based on the first NAN service discovery frame, the request frame including data;
receive a response frame from the first NAN enabled device; and
receive, from the first NAN enabled device, a second NAN service discovery frame comprising a second availability bitmap based at least in part on the received data, wherein the second availability bitmap includes at least one of a second indication of a second availability of the first NAN enabled device and a second availability duration of the first NAN enabled device.

22. The apparatus of claim 21, wherein the at least one processor is further configured to:
transmit a discovery beacon frame at periodic intervals, wherein the discovery beacon frame comprises information associated with the discovery window of the NAN.

23. The apparatus of claim 21, wherein the at least one processor is further configured to: transmit a synchronization beacon frame to a plurality of NAN enabled devices associated with the NAN.

* * * * *